(12) United States Patent
Ng

(10) Patent No.: US 6,655,801 B2
(45) Date of Patent: Dec. 2, 2003

(54) LOCKING APPARATUS WITH SPECTACLE STRUCTURE

(75) Inventor: Michael Hoi Ying Ng, Kowloon (HK)

(73) Assignee: Arts Optical Manufactory Ltd., Hong Kong (CN)

( * ) Notice: Subject to any disclaimer, the term of this patent is extended or adjusted under 35 U.S.C. 154(b) by 0 days.

(21) Appl. No.: 10/141,412

(22) Filed: May 8, 2002

(65) Prior Publication Data

US 2003/0123021 A1 Jul. 3, 2003

(30) Foreign Application Priority Data

Dec. 27, 2001 (CN) .......................................... 01280646

(51) Int. Cl.⁷ ................................................ G02C 5/00
(52) U.S. Cl. ........................ 351/141; 351/145; 351/146
(58) Field of Search ................................ 351/140, 141, 351/110, 142, 143, 145–147

(56) References Cited

U.S. PATENT DOCUMENTS 5,659,380 A * 8/1997 Kobayashi ................ 351/110
6,170,950 B1 * 1/2001 Yoshida ..................... 351/110
6,502,940 B1 * 1/2003 MacIntosh, Jr. ............ 351/110

* cited by examiner

*Primary Examiner*—Huy Mai
(74) *Attorney, Agent, or Firm*—Greer, Burns & Crain, Ltd.

(57) ABSTRACT

The present invention relates to a locking apparatus with a spectacle structure, arranged between a spectacle lens having assembling holes and a frame, between a lens and an accessory, between different accessories, and between an accessory and a frame, and including a bolt connected rigidly with said frame, a hollow slotted-head pin, said hollow slotted-head pin having a tapered outer surface and an inner hole screwed on said bolt, and a T-shaped pellet, said pellet is provided with a tapered inner hole, said pellet is sheathed on the outside of said hollow slotted-head pin and is in close contact with the inner wall of the assembling hole of said accessories. The present invention has, relatively fewer components and is easy to assemble and disassemble. All the combined accessories for fixing lenses are located within the assembling hole of the lens after the assembly, the whole assembly has a concise and beautiful appearance with the lenses fixed stably on position. The structure of the present invention is also suitable to lenses with different thickness.

6 Claims, 5 Drawing Sheets

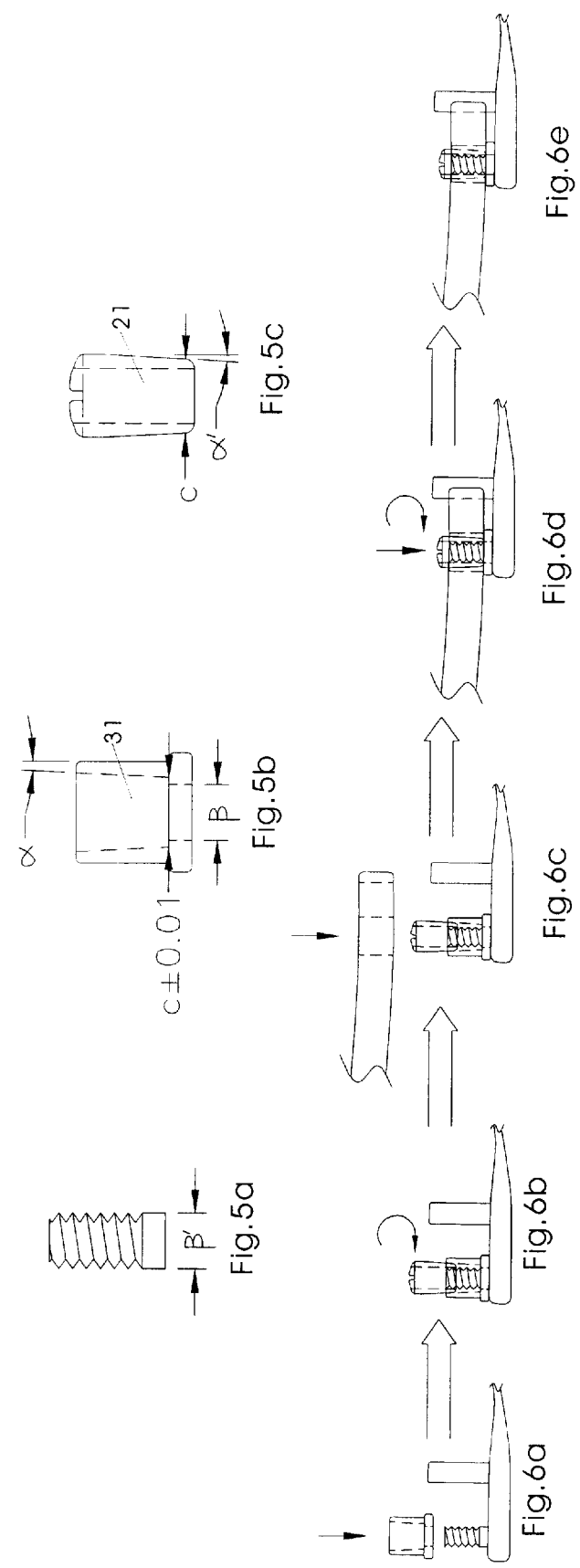

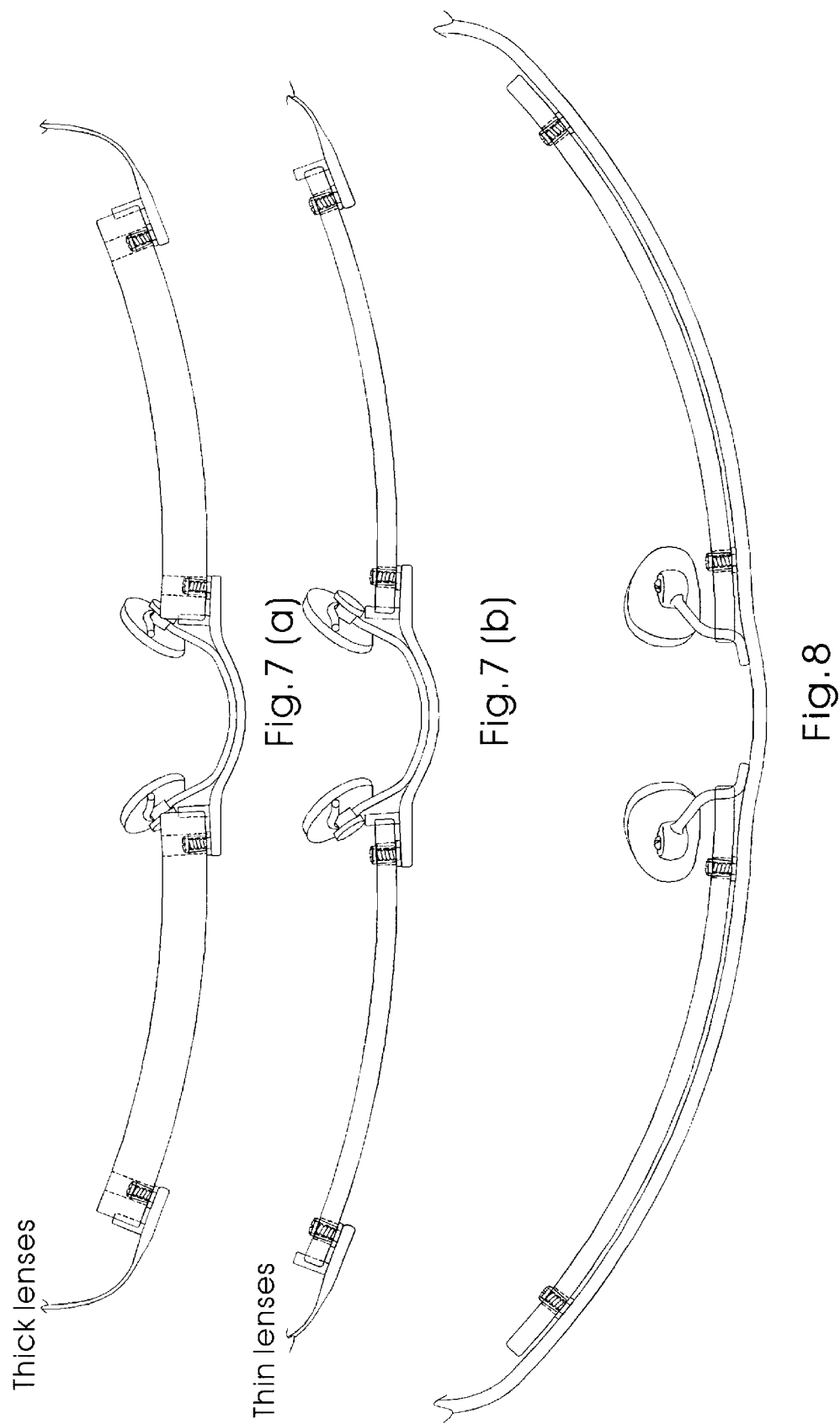

LOCKING APPARATUS WITH SPECTACLE STRUCTURE

TECHNICAL FIELD

The present invention relates to a locking apparatus with a spectacle structure, more particularly to a locking apparatus arranged between a spectacle lens and a frame, between a spectacle lens and an accessory, between different accessories, and between an accessory and a frame.

BACKGROUND OF THE INVENTION

In the frameless spectacles of the prior art, basically two types of connection between a spectacle lens and a frame are employed: the connection type of a nut and a screw, and the connection type of a tapered nail and a nylon pellet. In the type of a nut and a screw as shown in FIG. 1, the connection between the spectacle frame 1(e.g. the bridge or the bows) and the lens 2 is realized through a screw 3 welded to the frame 1 and a nut 4, the nut 4 being screwed on the screw 3 to fix the lens 2, and a rubber spacer 5 for damping being arranged between the nut 4 and the lens 2 and between the lens 2 and the frame 1. The disadvantages of this connecting apparatus are its non-concise outlook and its complicated assembly process. During the assembly process shown in FIGS. 2a–2e, each time all the accessories are typically assembled or dismantled sequentially one by one, resulting in a lower efficiency. Moreover, this combination is not compact in arrangement because of its many loose parts employed for components which are easily misassembled or omitted assembly of accessories (e.g. rubber spacer 5), causing problems in lowered quality (e.g. lens breakage). In addition, the screw 3 of this structure is relatively long and has no protecting means, so that the screw 3 is very easily broken or buckled, especially when a copper-nickel alloy is used as the screw material. The application range of this structure of connection is also limited by the screw length. If the screw has a relatively long length, a very long butt of the screw will be considered unattractive when it is connected with a thin lens, and if the screw is short one, it is not suitable for the assembly with a thick lens. In addition, this structure is relatively unsafe in that the long and sharp protruding metal butt of the screw is easy to scratch the user's face when the frame is damaged.

FIG. 3 shows the other structure of connection of the prior art between the lens and the frame. The connection of the frame 1 and the lens 2 is achieved through a tapered nail 6 connected with the frame 1, the nail 6 passing through an elastic nylon pellet 7 which is arranged within the hole of the lens. The tapered nail 6 expands and compresses the nylon pellet 7 to create a friction fit with the inner wall of the lens hole so as to fix the lens and the frame. A hook is provided on the top of the tapered nail 6 to prevent it from slipping out of the pellet 7. This structure puts a strict requirement on the dimensions of the accessories, and all the outer sizes of the accessories and their entire structures cannot be changed, so that the closeness of the contact between the lens 2 and the pellet 7 cannot be controlled at will according to the change in size of the hole of the lens 2, and the looseness and tightness of the lens 2 cannot be controlled manually. This structure puts a very high requirement on the hole drilling of the lens 2 (the tolerance should be ≦+0.05 mm), therefore the requirement on the processing of the hole is very strict. Nevertheless, lens loosening and falling-off still often occurs after assembly. In addition, since the lens in this structure is fixed through compression against the pellet by the tapered nail, cat-feeler shaped cracks and breakage of the lens will easily occur to mercury lenses.

SUMMARY OF THE INVENTION

To overcome the shortcomings of the prior art, the objective of the present invention is to provide a locking apparatus with a spectacle structure, for example the locking apparatus connecting a frame with a lens, which is simple in structure, easy to assemble, and suitable for lenses with different thickness, the whole assembly having a concise and beautiful appearance with the lenses fixed stably in position.

The objective is realized according to the present invention by providing a locking apparatus with a spectacle structure arranged between a lens having holes for assembly and a frame, including a bolt, which is connected rigidly with said frame, characterized in that it also contains a hollow slotted-head pin, said hollow slotted-head pin having a tapered outer surface with an inner hole threaded on said bolt; and a T-shaped pellet, said T-shaped pellet being provided with a tapered inner hole, said T-shaped pellet being sheathed on the hollow slotted-head pin and getting in close contact with the inner wall of the assembling hole of said lens.

Said locking apparatus, characterized in that the taper of said hollow slotted-head pin is identical with the taper of the inner hole of said T-shaped pellet.

Said locking apparatus, characterized in that the inner hole of said hollow slotted-head pin is provided with threads for threaded connection with said bolt.

Said locking apparatus, characterized in that the bottom diameter of the tapered inner hole of the T-shaped pellet is identical with the outer diameter of said bolt.

Said locking apparatus, characterized in that said T-shaped pellet has a good elasticity.

The present invention has relatively fewer components and is easy to assemble and disassemble, all the combined accessories for fixing lenses are located within the assembling hole of the lens, making the assembly appearance concise and beautiful. The taper of the inner hole of the T-shaped pellet is identical with the taper of the outer surface of the hollow slotted-head pin, ensuring thus that the pellet is enlarged or reduced as a whole after being expanded by the hollow slotted-head pin. The assembling hole of the lens is in full contact with the pellet experiencing a uniform stress, therefore no lens breakage due to local stress will occur. The present invention makes full use of the combined effect caused by the bolt threads and the expansion of the pellet, so that the looseness and tightness of the assembled structure can be adjusted and the lens breakage due to a direct contact between a metal piece and a lens can be avoided accordingly. In addition, as the hollow slotted-head pin is totally screwed on the bolt after the assembly, it can protect the bolt from being broken or becoming buckled. The locking apparatus according to the present invention puts no strict requirement on the hole drilling of the lens. The structure of the present invention is suitable to lens holes with a tolerance of +0.10 mm, and becomes very tight after the assembly, causing no looseness and cat-feeler shaped cracks, as well as breakage of the lens due to gaps or pressures on the lens. Besides, the structure of the present invention is also suitable for lenses with different thicknesses, and avoids scratching the user's face.

BRIEF DESCRIPTION OF DRAWINGS

FIG. 5a is a schematic diagram showing the structure of the bolt of FIG. 4;

FIG. 5b is a schematic diagram showing the structure of the hollow slotted-head pin of FIG. 4;

FIG. 5c is a schematic diagram showing the structure of the T-shaped pellet of FIG. 4;

FIGS. 6a–6e are schematic diagrams showing the assembly process of the present invention;

FIG. 7(a) is a schematic diagram showing the connection mode for thick lenses of a preferred embodiment according to the present invention; and FIG. 7(b) is a schematic diagram showing the connection mode for thin lenses of a preferred embodiment according to the present invention; and FIG. 8 is a schematic diagram showing the connection mode of another preferred embodiment according to the present invention.

DETAILED DESCRIPTION OF PREFERRED EMBODIMENTS

The present invention will now be described in more detail through the illustration of the preferred embodiments according to the present invention with reference to accompanying figures.

Figure 1:
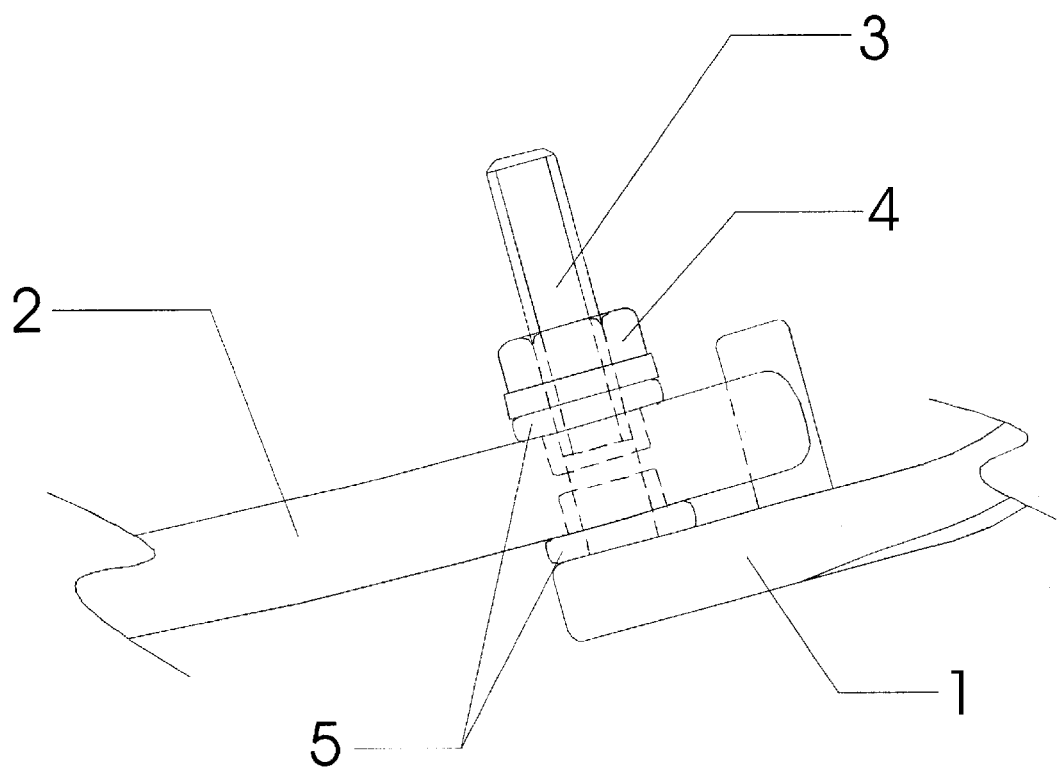
FIG. 1 is a schematic diagram showing a connection structure of a spectacle lens and a frame of the prior art.
Figure 2:
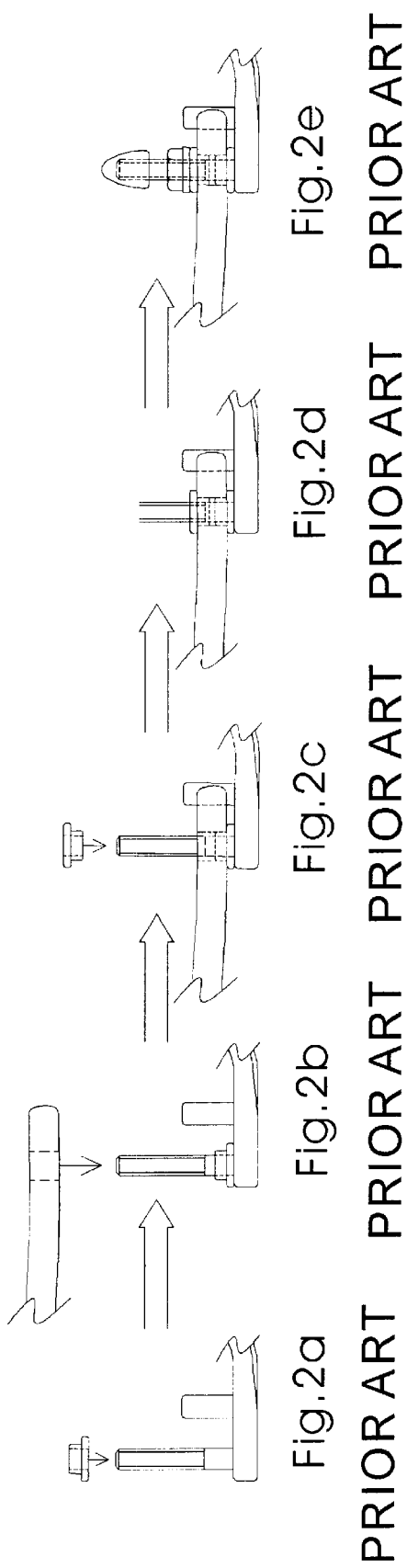
FIGS. 2a–2e are schematic diagrams showing the assembly process of the connection structure of FIG. 1.
Figure 3:
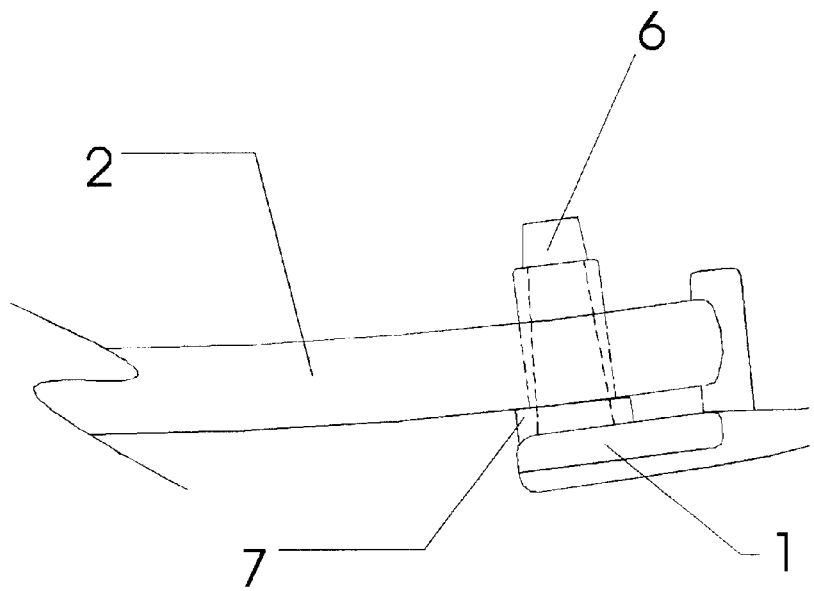
FIG. 3 is a schematic diagram showing another connection structure of a spectacle lens and a frame according to the prior art.
Figure 4:
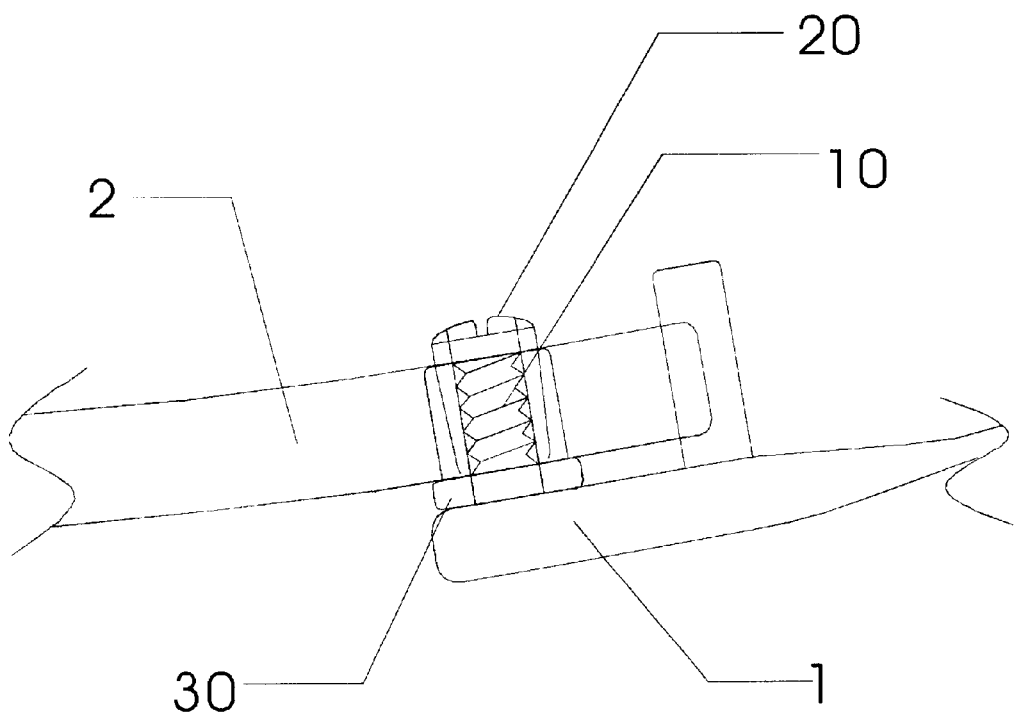
FIG. 4 is a schematic diagram showing the locking apparatus according to the present invention.

FIG. 4 shows the structure of a preferred embodiment according to the present invention. The locking apparatus for connecting a spectacle lens 2 and a frame 1 includes a metal bolt 10 welded to the spectacle frame (e.g. the bridge, rim, etc.), a hollow slotted-head pin 20 screwed on the metal bolt 10, and a T-shaped pellet 30, which has a good elasticity and is sheathed on the outside of the hollow slotted-head pin 20 and gets in contact with a drilled hole of the lens. As is shown in FIG. 5a, the metal bolt 10 has a threaded surface. The inner hole 21 of the hollow slotted-head pin 20 arranged on the outer surface of the bolt 10 is provided with threads, and can be connected with the bolt 10 through threads (FIG. 5b). The hollow slotted-head pin 20 has a tapered outer surface. The T-shaped pellet 30 shown in FIG. 5c has a tapered inner hole, which has a taper α identical to the taper α' of the outer surface of the hollow slotted-head pin 20, and the bottom diameter β of the inner hole of the T-shaped pellet 30 is equal to the diameter β' of the metal bolt 10.

FIGS. 6a–6e show the assembling process of the present invention: The pellet 30 is sheathed on the bolt 10. One end of the hollow slotted-head pin 20 with a smaller outer diameter is then aligned with the bolt 10 and is screwed thereon a little. The assembled subunit is then put into the assembling hole of the lens, and is made to get in close contact with the inner wall of the assembling hole. The whole assembly process is finished after the hollow slotted-head pin 20 is screwed tightly with a screwdriver. During the disassembly, all the components can be dismantled easily only by loosening the hollow slotted-head pin 20.

FIGS. 7(a–b) show a locking mode according to the present invention applied in a 3-component lens frame assembly. The structure of the present invention can be used to connect the bridge with the lens and the angled frame with the lens. A concise and beautiful appearance is then achieved with a very tight structure, making it possible to control the pressure of the combined accessories on the lens hole and avoiding lens breakage and lens loosening.

FIG. 8 shows a locking mode according to the present invention applied in the upper part of a lens frame. The structure of the present invention can be used as a bridge for connecting the upper part of the lens frame with the lens. A concise and beautiful appearance is then achieved with a very tight structure, and the lens breakage or lens loosening due to the direct contact between metal accessories and lenses are totally avoided.

While the present invention has been described with reference to preferred embodiments, it is to be understood by those who are skilled in the art that certain substitutions and alterations may be made thereto without departing from the spirit and scope of the present invention as set forth in the appended claims.

What is claimed is:

1. A locking apparatus for a spectacle structure, arranged between, at least one of a spectacle lens having assembling holes and a frame, between an accessory and a frame, between a lens and an accessory, and different accessories, comprising:

a bolt, connected rigidly with said frame, said frame also contains a hollow slotted-head pin, said hollow slotted-head pin having a tapered outer surface and an inner hole screwed on said bolt, and a T-shaped pellet, provided with a tapered inner hole, said pellet is sheathed on the outside of said hollow slotted-head pin and is in close contact with the inner wall of the assembling hole of said accessories spectacle lens.

2. A locking apparatus according to claim 1, characterized in that the taper of said hollow slotted-head pin is identical with the taper of the tapered hole of said T-shaped pellet.

3. A locking apparatus according to claim 2, characterized in that the inner hole of said hollow slotted-head pin is provided with threads for conducting threaded connection with said bolt.

4. A locking apparatus-according to claim 3, characterized in that the bottom diameter of the tapered hole of said T-shaped pellet is identical with the outer diameter of said bolt.

5. A locking apparatus according to claim 1, characterized in that said T-shaped pellet has good elasticity.

6. A locking apparatus with a spectacle structure, arranged between a spectacle lens having assembling holes and a frame, between an accessory and a frame, between a lens and an accessory, and between different accessories, including a bolt, connected rigidly with said frame, characterized in that said frame also contains a hollow slotted-head pin 20, said hollow slotted-head pin 20 having a tapered outer surface and an inner hole screwed on said bolt, and a T-shaped pellet, said pellet is provided with a tapered inner hole, said pellet is sheathed on the outside of said hollow slotted-head pin and is in close contact with the inner wall of the assembling hole of said spectacle lens.

* * * * *